US011539692B2

(12) United States Patent
Chhabra et al.

(10) Patent No.: US 11,539,692 B2
(45) Date of Patent: Dec. 27, 2022

(54) SETTING BASED ACCESS TO DATA STORED IN QUARANTINED MEMORY MEDIA

(71) Applicant: Micron Technology, Inc., Boise, ID (US)

(72) Inventors: Bhumika Chhabra, Boise, ID (US); Carla L. Christensen, Boise, ID (US); Zahra Hosseinimakarem, Boise, ID (US); Radhika Viswanathan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 16/996,789

(22) Filed: Aug. 18, 2020

(65) Prior Publication Data

US 2022/0060472 A1 Feb. 24, 2022

(51) Int. Cl.
*H04L 29/06* (2006.01)
*G06F 21/78* (2013.01)
*G06F 12/14* (2006.01)
*H04L 9/40* (2022.01)

(52) U.S. Cl.
CPC ...... *H04L 63/0861* (2013.01); *G06F 12/1483* (2013.01); *G06F 21/78* (2013.01); *H04L 63/083* (2013.01); *H04L 63/107* (2013.01)

(58) Field of Classification Search
CPC . H04L 63/0861; H04L 63/083; H04L 63/107; G06F 12/1483; G06F 21/78
USPC ....................................................... 713/186
See application file for complete search history.

(56) References Cited

U.S. PATENT DOCUMENTS

| 10,051,416 | B1* | 8/2018 | Tudor ................... H04N 13/296 |
| 2009/0212902 | A1* | 8/2009 | Haddock ................ G07C 9/257 340/5.2 |
| 2016/0308881 | A1* | 10/2016 | Zhang ..................... H04L 51/04 |
| 2019/0349377 | A1 | 11/2019 | Keene et al. |
| 2019/0392841 | A1* | 12/2019 | Kurian .................... G10L 13/02 |
| 2020/0162474 | A1 | 5/2020 | Zou et al. |
| 2020/0204438 | A1 | 6/2020 | Narasimhan et al. |
| 2020/0236109 | A1 | 7/2020 | Steinberg et al. |
| 2021/0195279 | A1* | 6/2021 | Giladi ................... G06F 16/176 |

OTHER PUBLICATIONS

Android malware analysis and conceptual malware mitigation approaches, Oh et al, Oct. 2016 (Year: 2016).*

* cited by examiner

*Primary Examiner* — Jahangir Kabir
(74) *Attorney, Agent, or Firm* — Brooks, Cameron & Huebsch, PLLC

(57) ABSTRACT

Methods and apparatuses related to settings based access to data stored in quarantined memory media are described. Memory systems can include multiple types of memory media (e.g., volatile and/or non-volatile) and data (e.g., information included in) stored in the memory media are subject to risks of the data being undesirably exposed and/or viewable to the public. According to embodiments of the present disclosure, a particular portion and/or location in the memory media can provide a data protection scheme, and a setting associated with the data can include security protocols that can control the accessibility to the stored data. For example, a setting can be associated with data to be stored in a particular location of the memory media, and responsive to a request to access the data, the setting can initiate an authentication of the request.

19 Claims, 5 Drawing Sheets

549 ↘

| RECEIVING, BY A MEMORY SYSTEM THAT, FIRST DATA FROM AN IMAGE SENSOR WHILE THE MEMORY SYSTEM IS IN A GEOGRAPHIC LOCATION AND SECOND DATA FROM THE IMAGE SENSOR WHILE THE MEMORY SYSTEM IS IN A SECOND GEOGRAPHIC LOCATION THAT IS DIFFERENT FROM THE FIRST GEOGRAPHIC LOCATION | 550 |

| STORING, IN RESPONSE TO THE FIRST DATA BEING RECEIVED WHILE LOCATED IN THE FIRST GEOGRAPHIC LOCATION, THE FIRST DATA IN A FIRST ADDRESS SPACE OF THE MEMORY SYSTEM | 552 |

| STORING, IN RESPONSE TO THE SECOND DATA BEING RECEIVED WHILE LOCATED IN THE SECOND GEOGRAPHIC LOCATION, THE SECOND DATA IN A SECOND ADDRESS SPACE OF THE MEMORY SYSTEM, WHEREIN THE SECOND ADDRESS SPACE IS QUARANTINED SUCH THAT A REQUEST TO ACCESS DATA STORED IN THE SECOND LOCATION IS LIMITED BY AUTHENTICATION OF THE REQUEST TO GRANT ACCESS TO THE DATA | 554 |

*Fig. 5*

SETTING BASED ACCESS TO DATA STORED IN QUARANTINED MEMORY MEDIA

TECHNICAL FIELD

The present disclosure relates generally to semiconductor memory and methods, and more particularly, to methods and apparatuses for setting based access to data stored in quarantined memory media.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to write (e.g., store) data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 5 is another flow diagram of a method for setting based access to data stored in quarantined memory media in accordance with a number of embodiments of the present disclosure.

DETAILED DESCRIPTION

Figure 1:
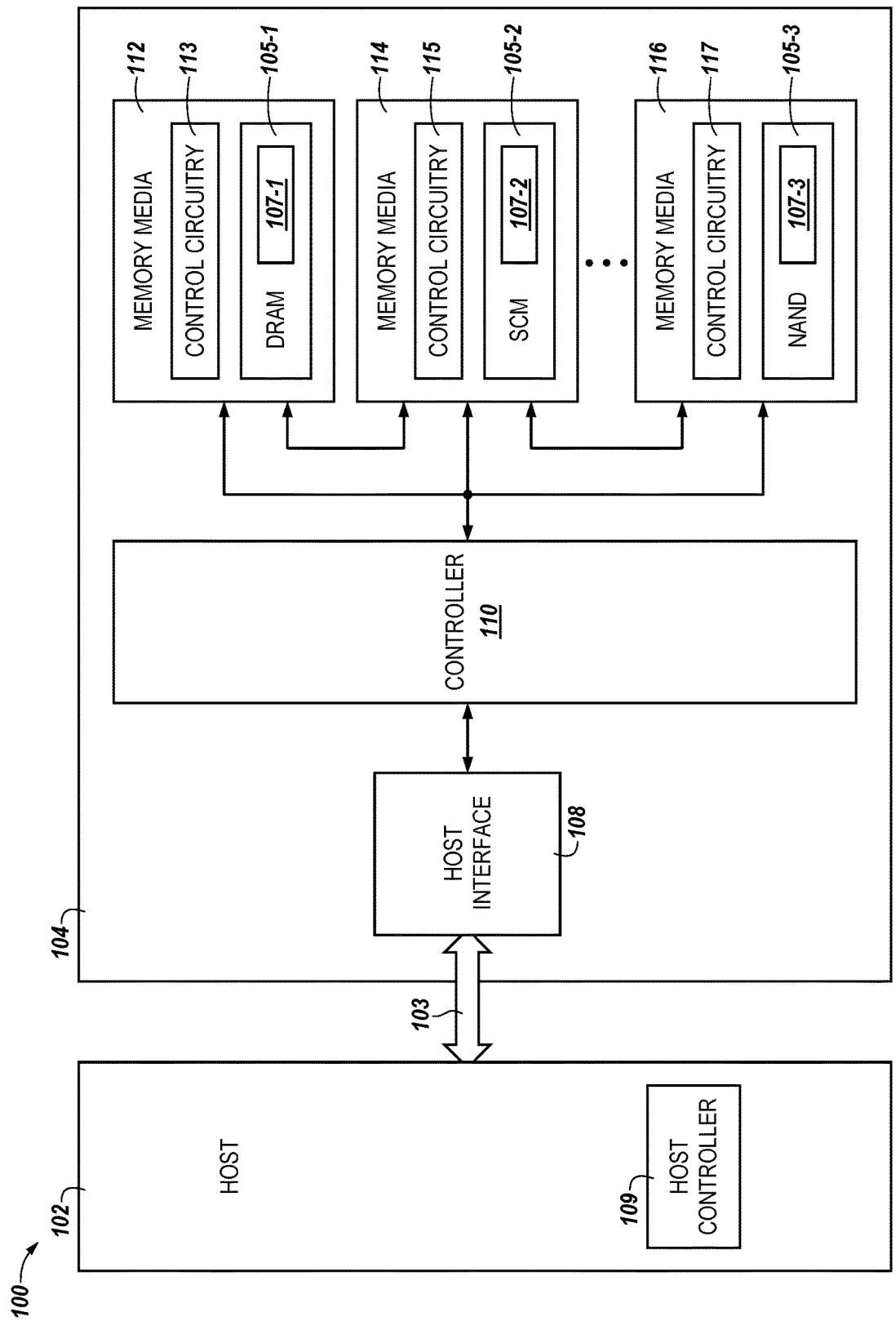
FIG. 1 is a functional block diagram in the form of a computing system including an apparatus in the form of a memory system in accordance with a number of embodiments of the present disclosure.

Methods and apparatuses related to settings based access to data stored in quarantined memory media are described. Memory systems can include multiple types of memory media (e.g., volatile and/or non-volatile) and data (e.g., information included in) stored in the memory media often are subject to risks of the data being undesirably exposed to the public, other entities, platforms, or people. For example, requests to view and/or store data in the memory media can often be made and accepted without a user's awareness, which can lead to the undesirable exposure of the data. According to embodiments of the present disclosure, a particular portion and/or location (e.g., address space) in the memory media can provide a data protection scheme such that data stored in the particular location can be prevented from being transferred out of the computing system. One or more settings can be associated with and/or applied to data. Some settings can include security protocols that can authenticate a request to view or otherwise manipulate the data stored in the particular locations.

For example, a memory system that comprises a plurality of memory media, can receive data, where at least two of the plurality of memory media are different types of memory media, the memory system can associate a setting with the data, based on one or more attributes of the data, and store the data in a particular location of the plurality of memory media, based at least in part on the one or more attributes of the data, the associated setting, or both, where the particular location is quarantined such that access to the data stored in the particular location is limited and receive a request to access the data stored in the particular location and initiating an authentication of the request to access the data.

A computing system including memory systems can include one or more different memory media types which can be used to write data in a computing system. Such data can be transferred between a host associated with the computing system and the memory system. The data written in memory media can be important or even critical to operation of the computing system and/or the host. There are various types of memory media, and each type of memory media includes characteristics that may be unique to the memory media type. As used herein, types of memory media can include, among others, non-volatile memory and volatile memory.

For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data (e.g., host data, error data, etc.), and volatile memory types can include random-access memory (RAM), dynamic random access memory (DRAM), and static random access memory (SRAM), among others. The characteristics of different memory media types can include features that cause tradeoffs related to performance, storage density, energy requirements read/write speed, cost, etc. In some examples, some memory media types may be faster to read/write as compared to other memory media types but less cost effective than other memory media types. In other examples, memory media types may be faster as compared to other memory media types but consume a large amount of power and reduce the life of a battery, while other memory media types can be slower and consume less power.

Often, applications run on the host can grant permission to access data (e.g., image data) stored in the memory media. In this case, even when the host includes various data protection scheme (e.g., data encryption) that prevents data from being illegitimately retrieved (e.g., transferred) out of the host, the data protection scheme can be undesirably nullified (e.g., in contrast to user's intent) and the data can be undesirably leaked and/or exposed. As an example, the host and the memory media can be (e.g., legitimately) programmed in a way that the applications run on the host are permitted to access the data stored in the memory media, in contrast to the user's intent. In this event, even though the user may not desire the data to be exposed, the data can be undesirably accessed by applications associated with a cloud system and/or social networking service (SNS), which can lead to undesired exposure of the data to, the public, other media platforms, or other people.

In contrast, embodiments herein can allow a computing system to limit (e.g., limitedly allow) and/or prevent requests to access (e.g., view) data stored in a particular location of the computing system. Accordingly, data including sensitive information and/or information that is undesired to be exposed and/or viewed to another party can be selectively and/or automatically stored in the particular location and protected against various attacks and/or undesired (but legitimate) requests. Settings can be associated with and/or applied to the data stored in the particular location. The settings can be security settings. For example, a security setting may require a password, facial recognition data, biometric data, etc. to gain access to view or manipulate the data stored in the particular location. As used herein, the term "location" refers to a portion and/or an area corresponding to a number of memory cells that are configured to store data.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 102 can reference element "02" in FIG. 1, and a similar element can be referenced as 202 in FIG. 2. A group or plurality of similar elements or components can generally be referred to herein with a single element number. For example, a plurality of reference elements 230-1, . . . , 230-N (e.g., 230-1 to 230-N) can be referred to generally as 230. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a host interface 108, a controller 110, (e.g., a processor, control circuitry, hardware, firmware, and/or software) and a number of memory media devices each including control circuitry. Memory system 104 can be located a location that is remote (e.g., part of a cloud database) from a host and/or from a location of a user that is accessing the memory system 104.

The host 102 can be a host system such as a personal laptop computer, a vehicle, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices such as a number of processing resources (e.g., one or more processors, microprocessors, image processor, and/or some other type of controlling circuitry). One of ordinary skill in the art will appreciate that "a processor" can intend one or more processors, such as a parallel processing system, a number of coprocessors, etc. The host 102 can be coupled to a host interface 108 of the memory system 104 by a communication channel 103.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, smart home devices, monitoring devices, wearable devices, devices enabling intelligent shopping systems, among other cyber-physical systems.

The host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing applications, controlling peripherals, etc.

In some embodiments, the applications running on the computing system 100 may request access to data stored in the memory system 104 such as in a plurality of memory media 112, 114, and/or 116. Such a request can be made in various manners. For example, the request can be made explicitly such that a user handling the computing system 100 (e.g., host 102) may be aware of the request made by the applications. In another example, the request can be made implicitly and/or may have been already accepted by the host 102 without the user being aware of the request. Accordingly, though the user has not given an explicit permission to do so, the application can still access the data stored in the plurality of memory media 112, 114, and/or 116 and the accessed data may be exposed to a public undesirably, but legitimately.

Therefore, providing a data protection scheme against undesired but legitimately made requests is of importance. Embodiments provides such data protection scheme by storing data in a particular location of the memory system 104 and providing a higher degree of a data protection scheme to the data stored in the particular location, which can be referred to as a quarantined location. As used herein, the term "quarantined location" refers to a location within and/or among multiple memory media that is quarantined and provided a higher degree of data protection from other locations, which can be referred to as non-quarantined location. For example, data stored in the quarantined location (e.g., quarantined locations 107-1, 107-2, and/or 107-3) can be entirely prevented from being transferred out of a computing system (e.g., computing system 100), while data stored in the non-quarantined location can be allowed to be transferred out of the computing system. As an example, the data stored in the quarantined location can be prevented from being transferred out of the computing system regardless of a type of and/or a nature of requests made for accessing the data.

A non-limiting example of multiple memory media having various types are described in FIG. 1. For example, as illustrated in FIG. 1, the memory system can include memory media such as memory media 112 including control circuitry 113 and an array of DRAM memory cells 105-1, memory media 114 including control circuitry 115 and an array of SCM memory cells 105-2, and memory media 116 including control circuitry 117 and an array of NAND memory cells 105-3. While three memory media types (e.g., DRAM 105-1, SCM 105-2, and/or NAND 105-3) are illustrated, embodiments are not so limited, however, and there can be more or less than three memory media types. Further, the types of memory media (e.g., types of arrays of memory cells) are not limited to the three specifically illustrated (e.g., DRAM 105-1, SCM 105-2, and/or NAND 105-3) in FIG. 1, other types of volatile and/or non-volatile memory media types are contemplated. In a number of embodiments, the controller 110, the memory media 112, 114, and 116, and/or the host interface 108 can be physically located on a single die or within a single package, (e.g., a managed memory application). Also, in a number of embodiments, a plurality of memory media (e.g., memory media 112, 114, and/or 116), can be included on a single memory system 104. Also, in some embodiments, more than one memory media can include a same type of array of memory cells. For example, instead of memory media 112 having an array of DRAM memory cells and memory media 114 having an array of SCM memory cells, both memory media 112 and 114 can have an array of SCM memory cells.

At least one of the plurality of memory media can include a quarantined location. As a non-limiting example as illustrated in FIG. 1, the array of each memory media can include a quarantined location. For example, the memory media 112, 114, and 116 can include quarantined locations 107-1 (included within the DRAM array 105-1), 107-2 (included within the SCM array 105-2), and 107-3 (included within the NAND array 105-3), respectively. In a number of embodiments, access to data stored in the quarantined location can be entirely prevented and/or limited, which can prevent applications (e.g., that may have been granted permission to access the data) from accessing the data stored in the quarantined location and protect the data against the undesirable exposure to a public.

Although FIG. 1 illustrates that a quarantined location is located as a portion of each memory media 112, 114, and 116, various and/or different locations of the memory media 112, 114, and/or 116 can be configured as a quarantined location. For example, one of the memory media 112, 114, and/or 116 can include a quarantined location, while other memory media 112, 114, and/or 116 do not include. For example, unlike how it is illustrated in FIG. 1, in which only a portion of the memory media is configured as a quarantined location, the entire memory media can be configured as a quarantined location.

As illustrated in FIG. 1, the controller 110 can be coupled to the host interface 108 and to the memory media DRAM 112, SCM, 114, and NAND 116 via one or more channels and can be used to transfer data between the memory system 104 and a host 102 having a host controller 109. The host interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The computing system 100 can include separate integrated circuits or the host 102, the memory system 104, the host interface 108, the controller 110, and/or the memory media DRAM 112, SCM 114, and/or NAND 116 can be on the same integrated circuit. The computing system 100 can be, for instance, a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In some embodiment, the computing system 100 (e.g., host 102) can be in one of a number of operation modes, which can determine whether data received at the computing system 100 is to be stored in a quarantined location or a non-quarantined location of the plurality of memory media 112, 114, and/or 116. For example, a user may put the computing system 100 into a first operation mode (e.g., public operation mode) and data generated, obtained, and/or received during the first operation mode can be transferred to and stored in the non-quarantined locations 107-1, 107-2, and/or 107-3. In another example, a user may put the computing system 100 into a second operation mode (e.g., private operation mode), and data generated, obtained, and/or or received during the second operation mode can be transferred to and stored in the quarantined locations 107-1, 107-2, and/or 107-3.

In some embodiments, data received at the computing system 100 can include (e.g., one or more) attributes, which can be input to a setting that determines whether the data is to be stored in a quarantined location or a non-quarantined location of memory media (e.g., memory media 112, 114, and/or 116), and how the quarantined data can be accessed. As used herein, the term "setting" refers to a configurable guideline to direct data to a particular location, control accessibility, and/or viewability among memory media. A setting can include a security protocol. A security protocol can include a password, a two-step authentication, one or more security questions, a comparison of facial recognition data, a comparison of biometric data, or combinations thereof. For example, a setting can compare the attributes to corresponding thresholds and can determine whether each of the attributes is above or below a corresponding threshold, which can further determine whether the data is to be stored in a quarantined location or a non-quarantined location. The controller 110 and/or the host controller 109 can be configured to associate one or more settings to incoming data.

As used herein, the term "attributes" refers to aspects of the data, which can relate to, for example, user's desire whether the data stored in the memory system 104 can be made available to a public. Examples of the attributes can include a nature of information included within data (e.g., and/or a subject included within image data), a geographical location of the computing system 100 when and/or a time at which (e.g., or a period during which) the data were generated and/or obtained, the identity of a user operating the computing system 100 when and/or at a time at which the data is received obtained and/or generated. These attributes can indicate a degree of privacy, which determines whether to store data in a quarantined or in a non-quarantined location.

In some embodiments, a threshold can be pre-established (e.g., predetermined) and/or altered based on input from a user (e.g., host 102). As used herein, the term "input" refers to information about attributes included in the data. An input can be a calibration process where a user (of the host 102) establishes a threshold related to the attribute. For example, the input can be a user identifying whether particular data (e.g., image data) is to be stored in a quarantined location or a non-quarantined location. Based on the input, the controller 110 and/or the host controller 109 can identify a pattern shown by (e.g., underlying) multiple inputs from a user and can alter the pre-established threshold of a setting to better accommodate user's preferences. In another example, a threshold can include a pre-established facial recognition data (the facial recognition data of a user of the computing system 100) to compare to received facial recognition data. Further details associated with identifying a pattern underlying inputs from a user and applying the pattern to alter a pre-existing setting are described below in connection with FIG. 2.

A user can associate a setting to data stored in the quarantined locations 107-1, 107-2, and/or 107-3. The setting can include one or more security protocols that determine access and/or viewability of the data. For example, the computing system 100 can receive, by an image sensor (e.g., a camera) coupled to the host 102 and responsive to a request to access data stored in one of the quarantined locations 107-1, 107-2, and/or 107-3, facial recognition data of a user, where receiving the facial recognition data is included as part of the associated setting. The setting can allow access to the data based on the received facial recognition data matching an expected (e.g., a pre-established facial recognition data) facial recognition data included in the associated setting. The setting can refrain from allowing access to the data based on the received facial recognition data not matching an expected facial recognition data included in the associated setting.

A non-limiting example can include an adult associating a setting requiring a security protocol to data stored in quarantined locations 107-1, 107-2, and/or 107-3 such that a child (e.g., or another human or animal) who may be using a host system (e.g., a mobile phone) cannot access the data. This may avoid the child accessing, transferring, or otherwise viewing the data stored in quarantined locations 107-1, 107-2, and/or 107-3.

In some examples, a setting can be associated with data stored in quarantined locations 107-1, 107-2, and/or 107-3 manually by a user as the data is received by the memory system 104. In another example, a setting can be associated with data absent user input. In an embodiment, the memory system 104 can be configured to automatically associate a setting based on an attribute such as a geographical location.

For example, the memory system 104 (e.g., the controller 110) can identify a geographical location where data was received by the memory system 104, where the geographical location is an attribute of one or more attributes of the data and associate the setting based on the geographical location. The memory system 104 can store metadata, including a metadata value, associated with the data that can indicate the geographic location associated with the data. The geographic location information can be obtained by global positioning system (GPS) information of the memory system 104. The metadata indicating the geographic location associated with the data can be used by the memory system 104 to store the data in a particular location in the memory system 104, such a quarantined location. In another example, the memory system 104 can identify a user of a device (e.g., a mobile device) coupled to the memory system 104 when the data is received by the memory system 104, where the identity of the user is an attribute of the one or more attributes of the data, and associate the setting based on the identification of the user. In some embodiments, the memory system 104 can prompt the host 102 and/or a host system (e.g., a mobile device) responsive to an associated setting.

For example, the memory system 104 (e.g., the controller 110) can generate a prompt for facial recognition data responsive to the request to access data stored in the particular location (e.g., quarantined locations 107-1, 107-2, and/or 107-3) where the prompt is generated as part of the associated setting, and receive the facial recognition data via an image sensor coupled to the memory device (e.g., a camera of a mobile device). In another non-limiting example, the memory device 104 can generate a prompt for a password responsive to the request to access the data stored in the particular location, where the prompt is generated as part of the associated setting, and allow access to the data responsive to the conformation of the password.

Figure 2:
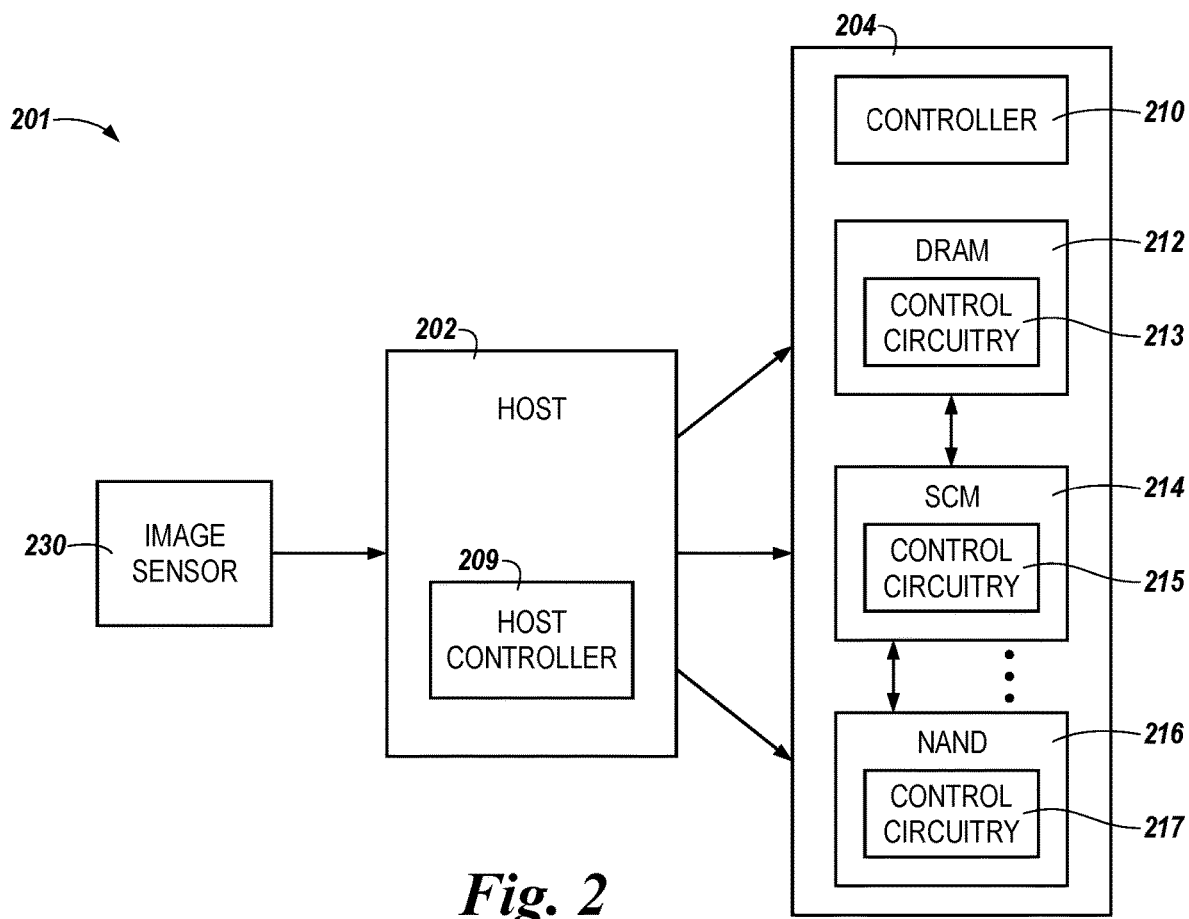
FIG. 2 is a functional block diagram in the form of a computing system including multiple memory media in accordance with a number of embodiments of the present disclosure.

FIG. 2 is a functional block diagram in the form of a computing system 201 including multiple memory media types in accordance with a number of embodiments of the present disclosure. FIG. 2 illustrates a computing system 201 which includes a host 202, including a host controller 209 which can be analogous to the host 102 and host controller 109 described in connection with FIG. 1. Computing system 201 includes a controller 210 which can be analogous to the controller 110 described in connection with FIG. 1. The computing system 201 can include image sensor 230, which can be communicatively coupled to the host 202.

As illustrated in FIG. 2, the memory system 204 can include memory media, such as memory media 212 including control circuitry 213 and an array of DRAM memory cells 205-1, memory media 214 including control circuitry 215 and array of SCM memory cells 205-2, and memory media 216 including control circuitry 217 and array of NAND memory cells 205-3 that can be analogous to memory media 112, 114, and 116, respectively, as described in connection with FIG. 1.

At least one of the plurality of memory media can include a quarantined location. As a non-limiting example as illustrated in FIG. 2, the array of each memory media can include a quarantined location. For example, the memory media 212, 214, and 216 can include quarantined locations 207-1 (included within the DRAM array 205-1) 207-2 (included within the SCM array 205-2), and 207-3 (included within the NAND array 205-3), respectively. Although FIG. 2 illustrates that a quarantined location is located as a portion of each memory media 212, 214, and 216, various and/or different locations of the memory media 212, 214, and/or 216 can be configured as a quarantined location. For example, one of the memory media 212, 214, and/or 216 can include a quarantined location, while other memory media 212, 214, and/or 216 do not include a quarantined location. For example, unlike how it is illustrated in FIG. 2, in which only a portion of the memory media is configured as a quarantined location, the entire memory media can be configured as a quarantined location.

The host 202 can be communicatively coupled to the sensors 230 via a physical connection (e.g., via wiring, circuitry, etc.) or remotely coupled (e.g., via a wireless signal, near field communication, Bluetooth, Bluetooth Low Energy, RFID, etc.). The host 202 can be communicatively coupled to one or more memory media types. FIG. 2 illustrates a non-limiting example of multiple memory media types in the form of a DRAM 212 including control circuitry 213, SCM 214 including control circuitry 215, and a NAND 216 including control circuitry 217. FIG. 2 illustrates an image sensor 230. In some examples described herein, the data can be image data received from the images sensor 230 coupled to the memory system 204. In some embodiments, the host 202 can be a mobile device (e.g., a smart phone) with a display that can display image data (e.g., received via the image sensor 230 (e.g., camera) to a user.

In a number of embodiments, access to data stored in the quarantined location can be entirely prevented and/or limited, which can prevent applications, users, or other entities, from accessing the data stored in the quarantined location and protect the data against the undesirable exposure. As described herein, whether to store data received at the computing system 201 can be based on one or more pre-established settings (e.g., each with respective one or more pre-established thresholds), which (e.g., whose corresponding threshold) can be altered based on inputs and/or a pattern identified from the inputs received from a user of the host 202.

The inputs (e.g., from a user and/or host 202) can indicate which attributes of the data deem important and/or private to a user. For example, user's inputs can include user switching between a first operation mode (e.g., public operation mode) and a second operation mode (e.g., private operation mode). For example, user's inputs can include user indicating particular data stored in a quarantined location to be stored in (e.g., transferred to) a non-quarantined location, and vice versa, which classifies data that has been classified as public data to private data, or data that has been classified as private data to public data. As used herein, the term "public data" can refer to data stored in a non-quarantined location, while the term "private data" can refer to data stored in a quarantined location.

There may be a pattern underlying user's inputs, and the host controller 209 and/or controller 210 can be configured to identify the pattern and utilized the pattern to generate settings and/or alter existing settings, as described below. For example, a user's inputs may indicate a pattern that data such as photographs (e.g., generated by a camera, such as image sensor 230) taken while the user is at a workplace and/or home are to be stored in a quarantined location. Then, the controller 210 and/or host controller 209 can generate and/or alter a setting such that the setting directs photographs that were generated, obtained, and/or received while the user is at such private places to be automatically stored in the quarantined location even without user's explicit direction to do so. For example, regardless of a place a user is located, user's inputs may indicate a pattern that photographs having a particular subject (e.g., a person and/or an animal that the user does not desire to be exposed to others) is to be stored in a quarantined location. Then, the controller 210 and/or host controller 209 can generate and/or alter a setting such that the setting directs photographs including the particular subject to be stored in the quarantined location even without user's explicit direction to do so. For example, a user's inputs may indicate a pattern that photographs generated at particular time and/or during a particular period (e.g., 9 am to 5 pm) are to be stored in the quarantined location. Then, the controller 210 and/or host controller 209 can generate and/or alter a setting such that the setting directs photographs taken at the particular time and/or during the particular period to be stored in the quarantined location.

In some embodiments, a pattern underlying inputs from a user and/or host 202 can indicate that existing setting can be discarded. For example, user's inputs may indicate a pattern that photographs generated during a particular period (e.g., 9 am to 5 pm) are to be stored in the non-quarantined location. Then, the controller 210 and/or host controller 209 can discard an existing setting that previously directed photographs generated during that period to be stored in the quarantined location.

The pattern underlying and identified from multiple inputs from a user can further alter a threshold of a setting that may have been pre-established. For example, user's inputs may indicate a pattern that photographs taken during 7 am to 3 pm to be stored in a quarantined location. In the same example, a setting with a previous threshold of 9 am to 5 pm can be altered to have a threshold of 7 am to 3 pm based on the newly-identified pattern.

Each time a setting is to be generated, altered, and/or discarded, the controller 210 and/or the host controller 209 can transmit a prompt to the host 202 and/or a user of the host 202 to alert the generation and/or alternation. The prompt can be accepted and/or rejected by the user. When accepted, the controller 210 and/or the host controller 209 can proceed with generating and/or altering the setting. When rejected, the controller 210 and/or the host controller 209 can discard the generation and/or alteration suggested via the prompt and operate the computing system 201 without the suggested generation and/or alteration.

In some embodiments, a prompt can be transmitted (e.g., by the controller 210 and/or the host controller 209) to a user each time a determination is to be made on whether received data (e.g., image data) is to be stored in the quarantined location and/or the non-quarantined location. For example, when a photograph is taken and corresponding data is received at the computing system 201 (e.g., host 202), a prompt may be transmitted and appear in a display of the computing system 201, which can give a user an option to select where to store the data (e.g., in quarantined location or non-quarantined location). Additionally, in some embodiments, a prompt can be transmitted by the controller 210 and/or the host controller 209 to a user each time a determination is to be made on whether received data (e.g., image data) is to be assigned a setting to control accessibility to the data.

In a non-limiting example, an apparatus (e.g., computing system 201 and/or memory system 204) can include a plurality of memory media (e.g., memory media 212, 214, and/or 216) and a controller (e.g., host controller 209 and/or controller 210) coupled to the plurality of memory media. At least two of the plurality of memory media can be different types of memory media (e.g., DRAM, SCM, and/or NAND as described herein). The controller 210 can be configured to receive a plurality of data, associate a setting to first data of the plurality of data and store first data in a first location of the plurality of memory media. The controller can be configured to associate a different setting to second data of the plurality of data and store the second data in a second location of the plurality of memory media. The controller 210 can receive a request to view the first data and the second data and initiate an authentication of the request where the authentication is based on the respective settings of the first data and the second data, allow the first data be viewed responsive to a confirmation of the setting of the first data; and refrain from allowing the second data to be viewed responsive to a failure in authentication of the setting of the second data.

Referring to the above example, the respective settings associated with the first data and the second data can include different requirements for security. For example, the setting associated with the first data can refrain from including any security protocols. The different setting associated with the second data can include stored facial recognition data. The controller 210 can transmit a prompt requesting facial recognition data to compare to the facial recognition data included in the different setting associated with the second data.

In a non-limiting example, the controller 210 can receive a request to transfer the second data to a different location of the apparatus, and request facial recognition data of a user requesting the transfer via the image sensor 230 coupled to the apparatus and responsive to the request to transfer the second data. The controller 210 can compare the received facial recognition data with facial recognition data included in the setting associated with the second data, wherein comparing facial recognition data is part of the authentication of the setting of the second data. In some embodiments, the first location can be a non-quarantined location and the second location can be a quarantined location (e.g., 207-1, 207-2, and/or 207-3).

Referring to the above example, the controller 210 can be configured to allow, in response to the received facial recognition data being the same as the facial recognition data included in the setting associated with the second data, the second data to be transferred to the different location. In a different example, the controller 210 can be configured to refrain from allowing, in response to the received facial recognition data being different from the facial recognition data included in the setting associated with the second data, the second data to be transferred to the different location.

The controller 210 can be configured to associate settings based on a geographic location. In some embodiments, the controller 210 can determine a geographic location where a first and a second data is generated, and assign the a setting to the first data and a different setting to the second data based at least in part on the geographical location where the first data and the second data was generated. For example, the first data can be generated outside of work and a setting that does not include security protocols can be associated with the first data. In contrast, the second data may have been generated in a restricted area and a setting that includes security protocols to be authenticated can be associated with the second data.

The request to access and/or transfer the plurality of data out of the apparatus can be a request to transfer the plurality of data to a different memory device located external to the apparatus (e.g., computing system 201 and/or memory system 204). For example, the different memory device can be a network attached storage (NAS) device and/or located in a data center that are often associated with SNS and/or cloud system. Accordingly, data (e.g., second data) stored in a quarantined location (e.g., second location) can be prevented from being uploaded to the SNS and/or cloud system. Also, memory system 204 can be located a location that is remote (e.g., part of a cloud database) from a host and/or from a location of a user that is accessing the memory system 204, such that data (e.g., second data) stored in a quarantined location (e.g., second location) can be prevented from being downloaded from cloud system that is storing the data.

In some embodiments, the second data stored in the second location (e.g., quarantined location) can be allowed to be transferred if a corresponding request is to transfer the second data to a different location within the apparatus. In this example, the different location can include a different location within the same memory media (e.g., where the second location is located), a different memory media, controller 210, and/or host 202 (e.g., host controller 209).

In some embodiments, the first location and the second location can be located and included in a same memory media (e.g., first memory media) of the plurality of memory media. In some embodiments, the first location can be located and included in a first memory media, while the second location can be located and included in a second memory media of the plurality of memory media.

In another non-limiting example, an apparatus (e.g., computing system 201 and/or memory system 204) can include a plurality of memory media (e.g., memory media 212, 214, and/or 216). In this example, at least two of the plurality of memory media can be different types (e.g., DRAM, SCM, and/or NAND as described herein) of memory media, and at least one of the plurality of memory media can include a quarantined location (e.g., 207-1, 207-2, and/or 207-3) and a request to access data stored in the quarantined portion can be limited. The apparatus can further include a controller (e.g., host controller 209 and/or controller 210) coupled to the plurality of memory media, and the controller can be configured to receive data and store the data in the quarantined location of the at least one of the plurality of memory media. The controller can be further configured to reject a request to transfer and/or view the data out of the apparatus such that the data is prevented, while the data is allowed to be transferred within the apparatus, from being transferred out of the apparatus. Stated differently, the data that is stored in a quarantined location (e.g., 207-1, 207-2, and/or 207-3) can be allowed to be transferred to other (e.g., quarantined locations of) memory media, controller 210 and/or host 202, but can be prevented from being transferred out of the computing system 201.

In contrast to data stored in the quarantined location, data stored in a non-quarantined location can be not prevented (e.g., allowed) from being transferred out of the apparatus. Various types of settings can be pre-established (e.g., with respective pre-established thresholds) and associated with data received at the controller 210. For example, absent an indication that the data is to be stored in the non-quarantined location, the data received at the controller 210 can be automatically transferred to and stored in the quarantined location of the at least one of the plurality of memory media. For example, absent an indication that the data is to be stored in the quarantined location, the data received at the controller can be automatically transferred to and stored in the non-quarantined location of the at least one of the plurality of memory media.

In some embodiments, the controller 210 can be configured to store the data in the quarantined location of the at least one of the plurality of memory media in response to one or more attributes of the data being less than a threshold. As described herein, new settings can be generated and/or thresholds of existing settings can be altered. For example, the controller 210 can be configured to receive one or more inputs indicating whether the data with the one or more attributes is to be stored in the quarantined location or non-quarantined location of at least one of the plurality of memory media. Additionally, or instead of, the controller 210 can be configured to receive one or more inputs indicating if a setting including a security protocol (e.g., facial recognition data, etc.) is to be added, subtracted, and/or altered. The controller 210 can be further configured to identify a pattern underlying the one or more inputs, and adjust the threshold based on the pattern.

Figure 3:
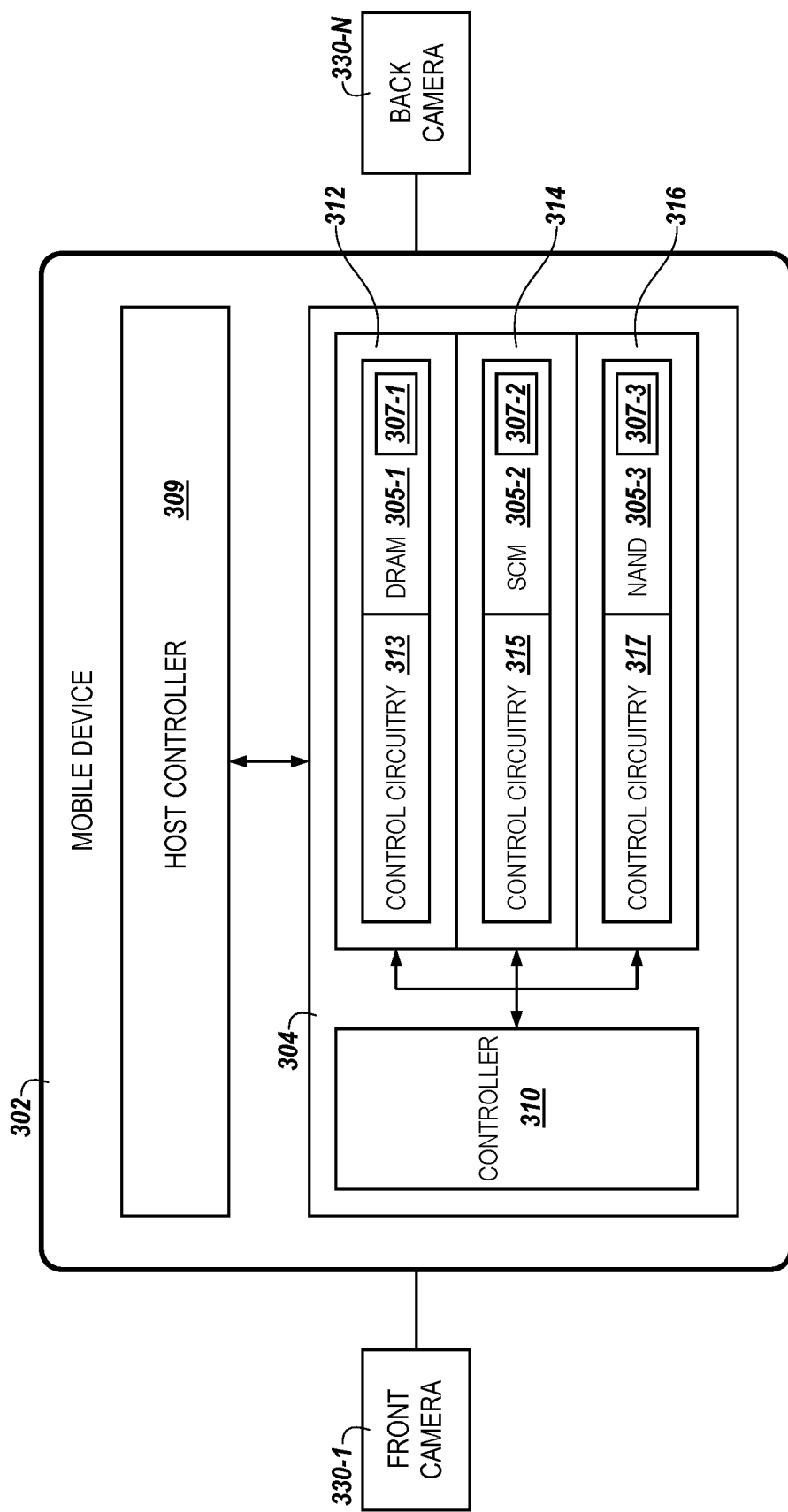
FIG. 3 is a diagram of a memory system including multiple memory media coupled to a host in the form of a mobile device in accordance with a number of embodiments of the present disclosure.

FIG. 3 is a diagram of a memory system 304 including multiple memory media types coupled to a host 302 in the form of a mobile device in accordance with a number of embodiments of the present disclosure. The host 302 can include a host controller 309 which can be analogous to the host 102 and host controller 109 respectively described in connection with FIG. 1. The host 302 can be communicatively coupled to image sensors in the form of a front camera 330-1 and a back camera 330-N which can be generally referred to as the cameras 330 and be analogous to image sensor 230 described in connection with FIG. 2.

The host 302 can include a memory system 304 which can be analogous to memory system 104 described in connection with FIG. 1 and include multiple memory media types. As illustrated in FIG. 3, the memory system 304 can include memory media, such as memory media 312 including control circuitry 313 and an array of DRAM memory cells 305-1, memory media 314 including control circuitry 315 and array of SCM memory cells 305-2, and memory media 316 including control circuitry 317 and array of NAND memory cells 305-3 that can be analogous to memory media 112, 114, and 116, respectively, as described in connection with FIG. 1.

At least one of the plurality of memory media can include a quarantined location. As a non-limiting example as illustrated in FIG. 3, the array of each memory media can include a quarantined location. For example, the memory media 312, 314, and 316 can include quarantined locations 307-1 (included within the DRAM array 305-1), 307-2 (included within the SCM array 305-2), and 307-3 (included within the NAND array 305-3), respectively. Although FIG. 3 illustrates that a quarantined location is located as a portion of each memory media 312, 314, and 316, various and/or different locations of the memory media 312, 314, and/or 316 can be configured as a quarantined location. For example, one of the memory media 312, 314, and/or 316 can include a quarantined location, while other memory media 312, 314, and/or 316 do not include. For example, unlike how it is illustrated in FIG. 3, in which only a portion of the memory media is configured as a quarantined location, the entire memory media can be configured as a quarantined location.

The example host 302 is in the form of a mobile device (e.g., an IoT enabled device). An IoT enabled device can include mobile phones, smart phones, tablets, phablets, computing devices, implantable devices, vehicles, home appliances, smart home devices, monitoring devices, wearable devices, devices enabling intelligent shopping systems, among other cyber-physical systems. The cameras 330 can include multiple types of cameras (e.g., video or static) located on the mobile device host 302. The location and/or operation of the cameras 330 can be an attribute of the image data and be used to generate a setting. For example, image data (e.g., photographs) generated by the front camera 330-1 may have similar or different settings than the back camera 330-N.

For example, a user of the mobile device 302 may provide different input about photographs generated from the front camera 330-1. A photograph generated from the front camera 330-1 may be a photograph taken by the user of the user (e.g., a selfie) that the user does not desire that to be exposed to a public, transferrable to SMS, or viewed by a different person (e.g., a child). Accordingly, a user may decide to store the photograph generated from the front camera 330-1 in one of quarantined locations 307-1, 307-2, and/or 307-3 of the memory media 312, 314, and/or 316. In another non-limiting example, photographs taken by the back camera 330-N may elicit different input. For example, photographs generated from the back camera 330-N may be of people, nature scenery, animals, object, etc. that the same user may not mind sharing the photographs to the public, transferrable to SMS, or viewed by a different person (e.g., a child).

Accordingly, a user may decide to store the photograph generated from the back camera 330-N in one of non-quarantined locations 307-1, 307-2, and/or 307-3 of the memory media 312, 314, and/or 316. Such a pattern derivable from those inputs can be associated by the host controller 309 and/or controller 310 such that the photograph taken by the front camera 330-1 can be automatically stored in one of the quarantined locations, while the photograph taken by the back camera 330-N can be automatically stored in one of the non-quarantined locations. Stated differently, a threshold of a setting applicable to data obtained via one sensor can be different from a threshold of the setting applicable to data obtained via another sensor.

Additionally, or instead of, the settings applicable to the data obtained via the respective cameras 330-1 to 330-N can include security protocols. For example, as discussed herein, settings can be associated with data generated based on a geographic location, the identity of a user generating the photographs, etc. In a non-limiting example, a parent of a child may associate a setting to restrict the transfer of photographs taken by the child to a cloud, SMS, or another computing device that is outside the host 302. The controller 310 and/or the host controller 309 can determine the identity of the user generating the data via the front camera 330-1 or the back camera 330-N.

The host controller 309 and/or the controller 310 can associate multiple settings (which can include security protocols) to photographs (e.g., image data) received from one or more cameras 330 (e.g., image sensors). For example, a first setting can include a first threshold, and responsive to receiving a first image from one or more cameras 330 (e.g., images sensors) the host controller 309 and/or the controller 310 can determine if the first image is above or below a first threshold corresponding to the first setting. If the first image has attributes that are above the first threshold corresponding to the first setting, the host controller 309 and/or the controller 310 can write the first image to a non-quarantine location of memory media 312, 314, and/or 316. If the first image is below the first threshold corresponding to the first setting, the host controller 309 and/or the controller 310 can write the first image to a quarantined location of the memory media 312, 314, and/or 316.

Continuing with the previous example, a second setting can include a second threshold, and responsive to receiving a second image data from one or more cameras 330 (e.g., images sensors) the host controller 309 and/or the controller 310 can determine if attributes of the second image data is above or below a second threshold corresponding to the second setting. If the second image has attributes that are above the threshold corresponding to the second setting the host controller 309 and/or the controller 310 can write the second image to a non-quarantined location of the memory media 312, 314, and/or 316. If attributes of the second image are below the second threshold corresponding to the second setting the host controller 309 and/or the controller 310 can write the second image to a quarantined location of the memory media 312, 314, and/or 316.

These settings can operate in combinations thereof. For example, the host controller 309 and/or controller 310 can determine to store single image data in a quarantined location of the memory media 312, 314, and/or 316 unless the single image data satisfies all of multiple settings associated with the single image data (e.g., attributes of the single image data being above of all thresholds of multiple settings). As described herein, access to data stored in the quarantined location, such as quarantined locations 307-1, 307-2, and/or 307-3 can be entirely prevented and/or limited which can prevent applications (e.g., that may have been granted permission to access the data) from accessing the data stored in the quarantined location and protect the data against the undesirable exposure to a public.

In other embodiments, the host controller 309 and/or the controller 310 can refrain from storing the image data (e.g., deleting the image data) in a particular memory media type (e.g., memory media 312, 314, and/or 316) to be potentially deleted from the mobile device 302 responsive to review by a user. For example, the host controller 309 and/or the controller 310 can associate one or more settings to a plurality of photographs generated from one or more cameras 330. The plurality of photographs can be written as described above to particular memory media types based on the thresholds of the associated settings, and responsive to a determination that the attributes of a portion of the plurality of photographs are not desired the host controller 309 and/or the controller 310 can write the data to a particular memory media type (e.g., NAND 316) to be reviewed by a user of the mobile device 302 for deletion.

Figure 4:
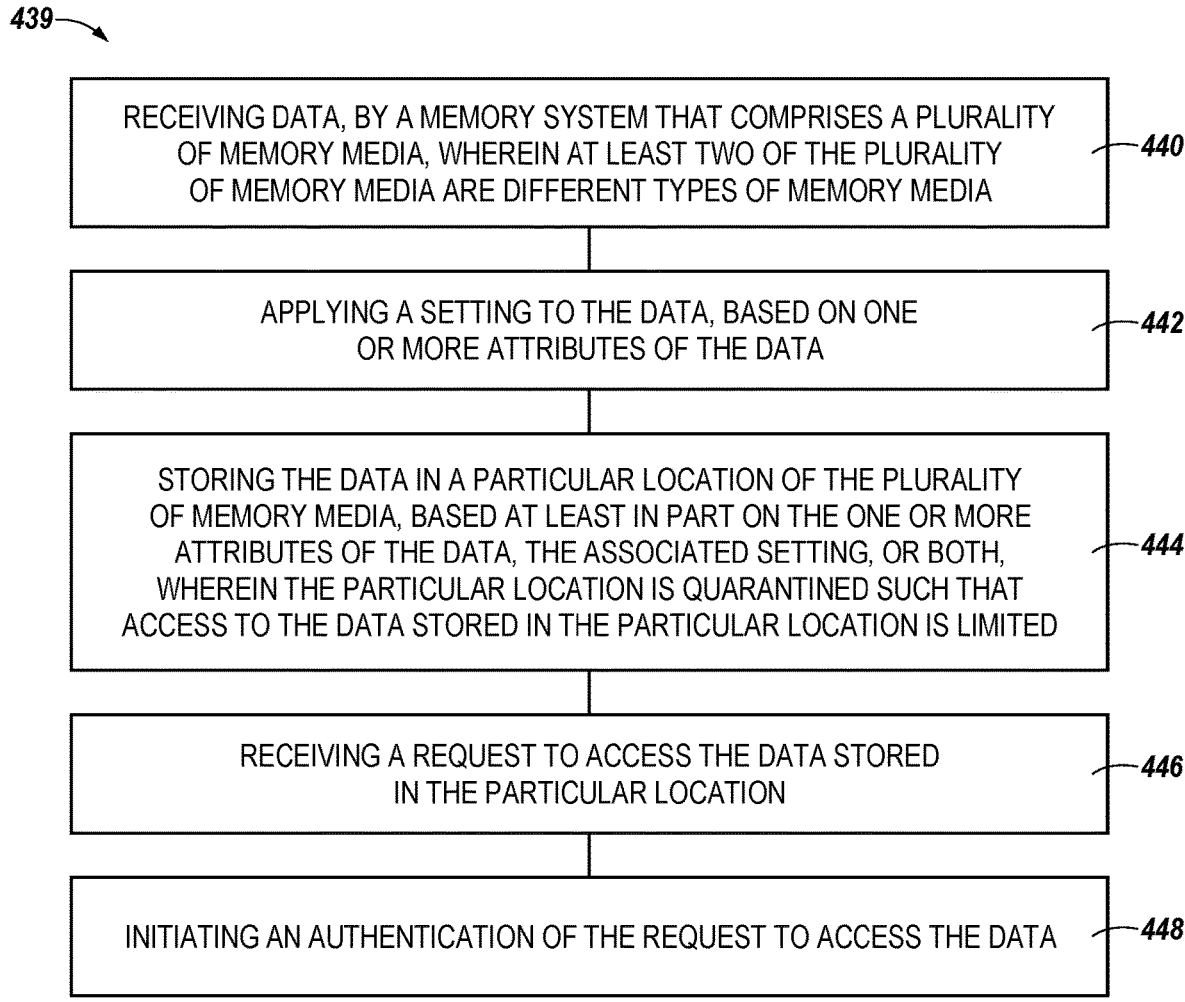
FIG. 4 is a flow diagram of a method for setting based access to data stored in quarantined memory media in accordance with a number of embodiments of the present disclosure.

FIG. 4 is a flow diagram 439 of a method for setting based access to data stored in quarantined memory media in accordance with a number of embodiments of the present disclosure. At 440, the method 439 can include receiving data, by a memory system (e.g., memory system 104, 204, and/or 304 as described in connection with FIGS. 1, 2, and 3, respectively) that comprises a plurality of memory media, wherein at least two of the plurality of memory media are different types of memory media. As described herein, the memory system can include a plurality of memory media having various types, and at least two of the plurality of memory media can be different types of memory media (e.g., DRAM, SCM, and/or NAND as described in connection with FIGS. 1, 2, and/or 3).

At 442, the method 439 can include associating a setting to the data, based on one or more attributes of the data. The one or more attributes of the data received at the memory system can be identified, for example, by a controller. The controller can be analogous to a controller such as controller 110, 210, and/or 310 as described in connection with FIGS. 1, 2, and 3. As described herein, the attributes can include a geographic location where the data was generated or received by the memory system and can be compared to threshold(s) of one or more settings. As described herein, the settings can include one or more security protocols.

At 444, the method 439 can include storing the data in a particular location of the plurality of memory media, based at least in part on the one or more attributes of the data, the associated setting, or both, wherein the particular location is quarantined such that access to the data stored in the particular location is limited. The data can be stored, in response to the one or more attributes of the data being identified, the associated setting, or both, in a particular location (e.g., of the plurality of memory media) that is quarantined (also referred to as a quarantined location). As described herein, the particular location is quarantined in a sense that a request to access data (e.g., view the data, transfer the data, or otherwise manipulate the data) stored in the quarantined location is limited.

At 446, the method 439 can include receiving a request to access the data stored in the particular location. Even when a request to transfer the data out of the memory system is received (e.g., at the controller), the data can be prevented from being transferred out of the memory system, or viewed, since the data is stored in the quarantined location of the plurality of memory media. For example, the data can be prevented from being viewed by a user or uploaded to a social networking service (SNS) and/or being (e.g., automatically) synchronized on a cloud system. The memory system can use the associated settings to authenticate the request to access the data.

For example, at 448, the method 439 can include initiating an authentication of the request to access the data. The memory system can, based on the associated setting, prompt the user for facial recognition data, a password, a two-step authentication, etc.

FIG. 5 is a flow diagram 549 of a method for setting based access to data stored in quarantined memory media in accordance with a number of embodiments of the present disclosure. At 550, the method 549 can include second data from the image sensor while the memory system is in a second geographic location that is different from the first geographic location. A plurality of memory media can include at least two different types of memory media. As described herein, the memory system can include a plurality of memory media having various types and at least two of the plurality of memory media can be different types of memory media (e.g., DRAM, SCM, and/or NAND as described in connection with FIGS. 1 and 2).

In some examples, the method 549 can further include associating a respective setting to the first data, based on the geographic location and associating another respective setting to the second data, based on the different geographic location. Access to the second data can require authentication as defined by the respective setting assigned to the second data, wherein the authentication can include a comparison of facial recognition data, a password comparison, or both.

At 552, the method 549 can storing, in response to the first data being received while located in the first geographic location, the first data in a first address space of the memory system. The first data that is received while the memory system is in the first geographic location can be stored in a first location of the plurality of memory media. At 554, the method 549 can include storing, in response to the second data being received while located in the second geographic location, the second data in a second address space of the memory system, wherein the second address space is quarantined such that a request to access data stored in the second location is limited by authentication of the request to grant access to the data. The second data that is received while the memory system is in the second geographic location can be stored in a second location of the plurality of memory media. The second location where the second data is or is to be stored can be quarantined (e.g., a quarantined location) such that a request to access (e.g., view, transfer, or otherwise manipulate) data stored in the second location is limited.

Accordingly, in response to receiving a request to view or transfer the second data out of the memory system, the method 549 can include preventing the second data from being transferred out of the memory system responsive to the second data being stored in the second location of the memory device, where preventing, in response to the data being stored in the second location, the second data from being transferred out of the memory system comprises preventing the data from being uploaded to a social networking service (SNS). In contrast, in response to receiving a request to transfer the first data out of the memory system, the first data can be allowed to be transferred out of the memory system.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. A method, comprising:
receiving first data and second data, by a memory system that comprises a plurality of memory media, wherein at least two of the plurality of memory media are different types of memory media;
associating a setting with the first data, based on one or more attributes of the first data;
associating a setting with the second data, based on one or more attributes of the second data;
storing the first data in a particular location of the plurality of memory media, based at least in part on the one or more attributes of the first data or the associated setting, or both, wherein the particular location is non-quarantined;
storing the second data in a particular location of the plurality of memory media, based at least in part on the one or more attributes of the second data or the associated setting, or both, wherein the particular location is quarantined such that access to the data stored in the particular location is limited;
receiving a request to access the first data stored in the particular location;
receiving a request to access the second data stored in the particular location;
initiating an authentication of the request to access the first data and the second data; and
preventing transfer of the second data out of the memory system, upon receipt of the request to access the second data, while transferring of the first data out of the memory system upon an additional verification measure using a facial recognition.

2. The method of claim 1, further comprising receiving, by an image sensor and responsive to authenticating the request to access the first data, facial recognition data of a user, wherein receiving the facial recognition data is included as part of the associated setting.

3. The method of claim 2, further comprising allowing access to the first data based on the received facial recognition data matching an expected facial recognition data included in the associated setting.

4. The method of claim 2, birther comprising refraining from allowing access to the first data based on the received facial recognition data not matching an expected facial recognition data included in the associated setting.

5. The method of claim 1, further comprising:
identifying a geographical location where the first data was received by the memory system, wherein the geographical location is an attribute of the one or more attributes of the first data; and
associating the setting based on the geographical location.

6. The method of claim 1, further comprising:
identifying a user of a device coupled to the memory system when the first data is received by the memory system, wherein the identity of the user is an attribute of the one or more attributes of the data; and
associating the setting based on the identification of the user.

7. The method of claim 1, further comprising:
generating a prompt for facial recognition data responsive to the request to access the first data stored in the particular location, wherein the prompt is generated as part of the associated setting; and receiving the facial recognition data via an image sensor coupled to the memory device.

8. The method of claim 1, further comprising:
generating a prompt for a password responsive to the request to access the first data stored in the particular location, wherein the prompt is generated as part of the associated setting; and
allowing access to the first data responsive to the conformation of the password.

9. The method of claim 1, further comprising assigning a first address space to a quarantined portion of the memory system.

10. The method of claim 1, wherein the first data is image data received from an image sensor coupled to the memory system.

11. A method, comprising:
receiving, by a memory system:
first data from an image sensor while the memory system is in a geographic location; and
second data from the image sensor while the memory system is in a second geographic location that is different from the first geographic location;
storing, in response to the first data being received while located in the first geographic location, the first data in a first address space of the memory system, wherein the first address is non-quarantined;
storing, in response to the second data being received while located in the second geographic location, the second data in a second address space of the memory system, wherein the second address space is quarantined such that a request to access data stored in the second location is limited by authentication of the request to grant access to the data; and
preventing transfer of the second data out of the memory system, upon receipt of the request to access the second data, while transferring of the first data out of the memory system upon an additional verification measure using a facial recognition.

12. The method of claim 11, further comprising preventing the second data from being transferred out of the memory system responsive to the second data being stored in the second location of the memory device.

13. The method of claim 12, wherein preventing, in response to the data being stored in the second location, the second data from being transferred out of the memory system comprises preventing the data from being uploaded to a social networking service (SNS).

14. The method of claim 11, further comprising:
assigning the first address space to a first memory media type of the memory system; and
assigning the second address space to a second memory media type of the memory system.

15. An apparatus, comprising:
a computer system memory coupled to a processor, the computer system memory comprising a plurality of memory media, wherein at least two of the plurality of memory media are different types of memory media; and
a controller coupled to the computer system memory wherein the controller is configured to:

receive a plurality of data;
associate a setting with first data of the plurality of data;
store the first data in a first location of the plurality of memory media, based on the associated setting;
associate a different setting to second data of the plurality of data;
store the second data of the plurality of data in a second location of the plurality of memory media, based on the associated different setting;
receive a request to view the first data and the second data;
initiate an authentication of the request, wherein the authentication is based on the respective settings of the first data and the second data;
allow the first data be viewed responsive to a confirmation of the setting of the first data;
refrain from allowing the second data to be viewed responsive to a failure in authentication of the setting of the second data; and
prevent transfer of the second data out of the memory system, upon receive of a request to access the second data without an additional verification measure using a facial recognition.

16. The apparatus of claim 15, wherein the controller is configured to:
receive a request to transfer the second data to a different location of the apparatus;
request facial recognition data of a user requesting the transfer via an image sensor coupled to the apparatus and responsive to the request to transfer the second data; and
compare the received facial recognition data with facial recognition data included in the setting of the second data, wherein comparing facial recognition data is pan of the authentication of the setting of the second data.

17. The apparatus of claim 16, wherein the controller is configured to allow, in response to the received facial recognition data being the same as the facial recognition data included in the setting associated with the second data, the second data to be transferred to the different location.

18. The apparatus of claim 16, wherein the controller is configured to refrain from allowing, in response to the received facial recognition data being different from the facial recognition data included in the setting associated with the second data, the second data to be transferred to the different location.

19. The apparatus of claim 15, wherein the controller is configured to:
determine a geographic location where the first and second data is generated; and
assign the setting to the first data and the different setting to the second data based at least in part on the geographical location where the first data and the second data was generated.

\* \* \* \* \*